(12) United States Patent
Stephen

(10) Patent No.: US 7,294,385 B1
(45) Date of Patent: Nov. 13, 2007

(54) FIXTURE WITH INTEGRAL STOPS

(76) Inventor: Robert Stephen, 2755 Thompson Creek Rd., Pomona, CA (US) 91767

( * ) Notice: Subject to any disclaimer, the term of this patent is extended or adjusted under 35 U.S.C. 154(b) by 112 days.

(21) Appl. No.: 10/644,196

(22) Filed: Aug. 19, 2003

(51) Int. Cl.
*B32B 1/00* (2006.01)

(52) U.S. Cl. .............. 428/98; 428/40.1; 428/343; 156/71

(58) Field of Classification Search .......... 428/40.1, 428/98, 343; 156/71; 248/205.3
See application file for complete search history.

(56) References Cited

U.S. PATENT DOCUMENTS

| | | | |
|---|---|---|---|
| 4,338,151 A | * | 7/1982 | Hutter, III ............ 156/344 |
| 4,822,656 A | * | 4/1989 | Hutter, III ............ 428/41.8 |

* cited by examiner

Primary Examiner—Alexander S. Thomas
(74) Attorney, Agent, or Firm—Russo & Duckworth, LLP

(57) ABSTRACT

An improved fixture is provided for securely mounting attachments to an underlying substrate. The fixture includes an outer support member, an inner retainer, a biasing means for biasing the inner retainer relative to the outer support member, and stops for controlling movement between the retainer and support member. The outer support member includes a central bore for receiving the inner retainer which holds an attachment, such as a threaded fastener. In use, the fixture is temporarily secured to a substrate with the inner retainer positioned so that the attachment does not engage the underlying substrate. Thereafter, the inner retainer is forced towards the substrate to a second position wherein the attachment engages the substrate. The fixture's stops project radially outward from the inner retainer and are sized and configured so as to engage the outer support member in the second position so as to prevent inadvertent excessive movement of the inner retainer towards the substrate.

14 Claims, 6 Drawing Sheets

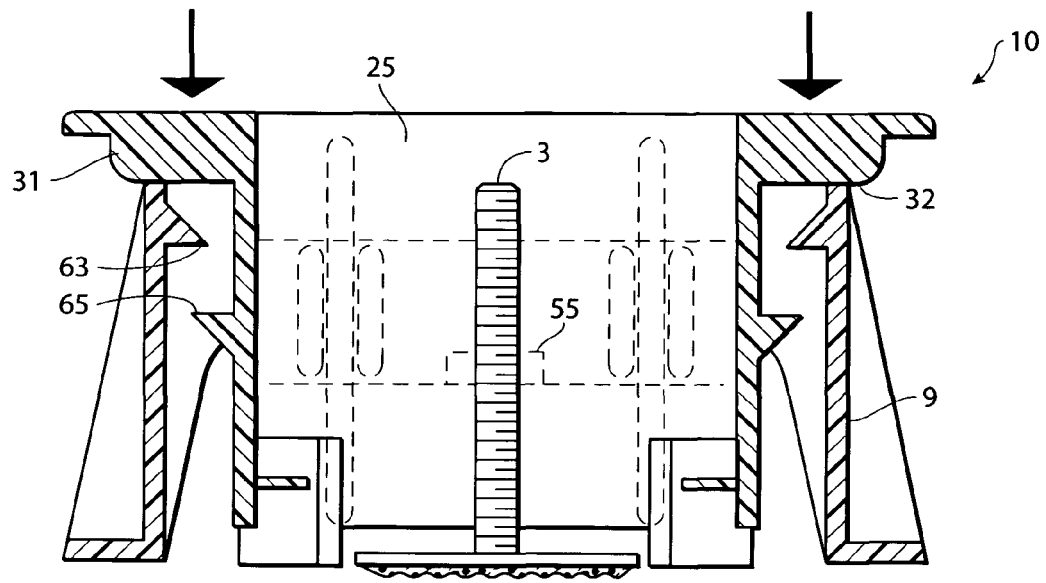
FIG. 11
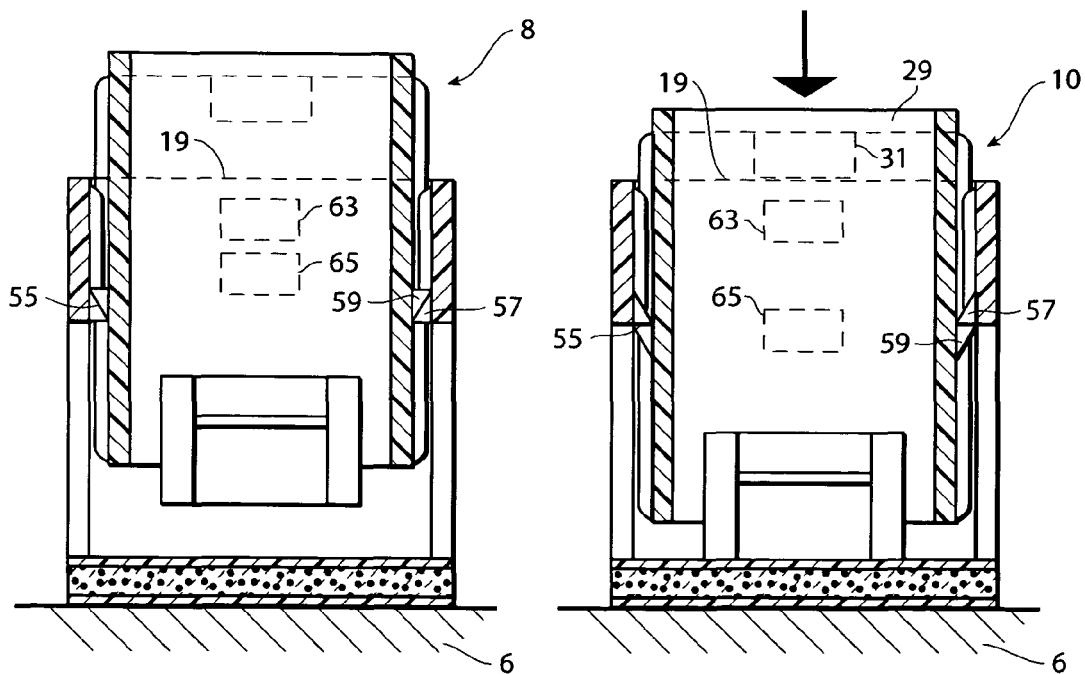
FIG. 12  FIG. 13

FIXTURE WITH INTEGRAL STOPS

BACKGROUND OF THE INVENTION

This invention relates generally to fixtures for affixing adhesive backed assemblies onto a support surface.

It is often desirable to secure an "attachment element", such as a patch or fastener or the like, onto a supporting surface, also referred to as a substrate. For example, holes in the skin of aircraft or boat holes may be repaired by applying a thin patch to close the opening. It is also known to mount threaded fasteners or the like onto a substrate so as to be able to attach additional components to the substrate's surface. In many cases, it is necessary for the attachment to be located on the substrate with high precision.

To this end, various fixtures have been devised for securing an attachment to a substrate. Typically, the fixtures include means for positively urging the attachment to a substrate while an adhesive bonds the attachment in place. Clamps and similar fixture devices have been used to position and hold the attachment in place while the adhesive cures. Unfortunately, many substrates have constructions which will not allow the use of a clamp to secure an attachment in place. Other fixture devices have been proposed which rely on suction cups for holding the fixture in place upon a substrate. However, suction cup devices are limited to being used on substrates having smooth surfaces. Also, suction cup devices can slowly release from a substrate.

To overcome these disadvantages, adhesive backed fixture assemblies have been devised which temporarily adhere to a substrate for providing pressure and for securing the attachment in place while an adhesive cures. For example, FIGS. 1-6 show prior art constructions which are the subject of U.S. Pat. Nos. 4,302,492; 4,338,151; 4,390,576 and 4,822,656. These patents describe one and two piece fixtures having a support member 9 which temporarily secures to a substrate 6 using a pressure sensitive adhesive or the like. The fixtures further include an inner retainer 25 for releasably holding an attachment 3, such as a threaded fastener. The inner retainer is moveable from a first position 8 to a second position 10. In the first position, the adhesive backed attachment is positioned so as to not engage the substrate. Meanwhile, in the second position, the inner retainer is moved inward so as to engage the substrate. For example, U.S. Pat. No. 4,390,576 and FIGS. 1-3 disclose two piece fixtures wherein a resilient ring holds the outer support member in place and exerts a positive force upon the attachment against the substrate. Once the attachment's adhesive is cured, the fixture, including outer support member and inner retainer, are removed leaving only the attachment in place securely affixed to the substrate. Similarly, U.S. Pat. No. 4,822,656 and FIGS. 4-6 illustrate one piece fixtures for securing an attachment to a substrate as the attachment's adhesive cures. Instead of using a resilient ring to urge the attachment against the substrate, the fixture includes a plurality of spokes which project radially inward from the outer support member to engage the inner retainer. Once the inner retainer is moved into its second position, the spokes apply positive pressure to the attachment while the attachment's adhesive cures.

Unfortunately, the adhesive backed fixtures described in the above-identified patents suffer from a significant disadvantage. In particular, persons applying such fixtures and their corresponding attachments to a substrate will often unintentionally place too much pressure upon the inner retainer. This excessive force causes adhesive material between the attachment and substrate to squeeze out from between the respective parts resulting in a weakened joint between the attachment and substrate when the adhesive cures. Unfortunately, the prior art fixtures do not include a means for preventing excessive force upon the inner retainer being transmitted to the attachment.

For example, FIGS. 1-6 show prior art fixture devices for securing an attachment to a substrate. To secure the attachment, a person places force upon the inner retainer 25 until the inner retainer has moved to a second position 10. In the second position, the attachment 3 engages the substrate 6. Unfortunately, when persons place force upon the inner retainer, often they will place excessive force on the retainer causing the adhesive 4 to seep from between the fastener and substrate resulting in a weakened bond. Moreover, as shown in FIGS. 1 and 2, though some fixture devices include a cap 29 for manual manipulation of the fixture, the cap is not constructed so as to engage the outer support member 9. Instead, when the inner retainer is moved to the second position, a space 12 is left remaining between the inner retainer and outer support member. Fixture devices including spokes also have not been devised to include a structure for preventing excessive seepage of the adhesive caused by excessive force upon the inner retainer. Instead, the resiliency of the spokes 53 permits the inner retainer to proceed far beyond the intended second position.

Accordingly, it would be highly desirable to provide a fixture which ensures that proper force is applied to an attachment as it adheres to a substrate.

Furthermore, it would be highly desirable to provide an improved fixture which ensures that excessive pressure is not transmitted to the attachment when the inner retainer is moved from its first non-engaging position to its second engaging position.

SUMMARY OF THE INVENTION

Briefly, in accordance with the invention, I provide an improved fixture for securing adhesive backed attachments to a substrate. The fixture includes an outer support member, an inner retainer and a biasing means. The outer support member includes a proximal extremity, a distal extremity and a central bore which extends the length of the support member's longitudinal axis. The outer support member further includes an adhesive upon the support member's distal extremity. The adhesive may be of various types known to those skilled in the art. However, a preferred adhesive includes a pressure-sensitive adhesive layer which can be temporarily affixed to a substrate.

The fixture of the present invention further includes a retainer for releasably holding an attachment at the inner retainer's distal extremity. The attachment may be affixed to the inner retainer using any of numerous means known to those skilled in the art such as frictional engagement, snaps, hook and pile fasteners, etc. The inner retainer is positioned within the outer support member's central bore and is telescopically moveable from a first position to a second position. The first position secures the attachment out of substantial bearing engagement with a substrate when the outer support member is affixed to a substrate. Meanwhile, when the inner retainer is moved to the second position, the attachment is positioned so as to engage an underlying substrate.

Meanwhile, the fixture's "biasing means" is provided for biasing the attachment into the substrate when the outer support member is affixed to the substrate and the inner retainer is moved to the second position. The biasing means may be any of numerous constructions as can be determined by one skilled in the art. For example, the biasing means may include a resilient pad between the outer support member and substrate as described in U.S. Pat. No. 4,390,576. The resiliency of the pad acts as a spring. When positioned in place, the resilient pad is in tension so as to place a predetermined force upon the attachment into the substrate. Alternatively, the biasing means may include a plurality of spokes which extend between the inner surface of the outer support member to engage the outer surface of the inner retainer as described in U.S. Pat. No. 4,822,656. When the inner retainer is moved to the second position, the spokes are placed in an over-center condition causing the spokes to be in compression and urge the attachment with a positive force towards the substrate. In still an alternative construction, the biasing means comprises a simple latch which locks the inner retainer into the second position. Where a simple latch or the like is provided to lock the inner retainer in place, the force exerted on the attachment toward the substrate is accomplished through the plastic deformation created in the fixture's components.

Finally, the fixture of the present invention includes a stop which ensures that the inner retainer is not forced beyond the predetermined second position when the inner retainer is moved from the first position to the second position. In a first embodiment, the stop projects radially outward from the inner retainer's proximal extremity. The stop is sized and positioned so as to engage the outer support member's proximal extremity when the inner retainer is moved into the second position. Upon the stop engaging the outer support member's proximal extremity, the inner retainer is restricted from further telescopic movement in the distal direction.

In use, an attachment in the form of a fastener or patch or the like is releasably attached to the distal extremity of the fixture's inner retainer. The attachment may be preconstructed to include an adhesive. Alternatively, a suitable quantity of adhesive material such as an epoxy resin, is applied to the underside of the attachment or directly to the substrate. The fixture is then temporarily secured to the substrate at a selected location by forcing the outer support member's adhesive backed distal extremity upon the substrate. When the fixture is first secured to the substrate, the inner retainer is initially located in the first position so that the attachment is not in bearing engagement with the substrate. However, the inner retainer is then manually forced from the first position to the second position by pushing on the inner retainer's proximal extremity until the inner retainer's stop engages the outer support member. Once the stop has engaged the outer support member, the fixture exerts a predetermined force upon the attachment against the substrate. Once the attachment's adhesive has properly cured, the fixture can be quickly and easily removed from the attachment and substrate. One merely lifts the fixture from the substrate to break the temporary adherence between the outer support member and substrate, leaving the attachment permanently affixed to the substrate.

Accordingly, it is a principle object of the present invention to provide an improved fixture for affixing attachments to substrates.

It is another object of the present invention to provide a fixture which ensures proper pressure upon an attachment during the curing process.

These and other further and more specific objects and advantages of the invention will be apparent to those skilled in the art from the following detailed description taken in conjunction with the drawings.

BRIEF DESCRIPTION OF THE DRAWINGS

FIG. 11 is a front cross-sectional view of the fixture of FIG. 7 wherein the inner retainer is in the second position;

FIG. 12 is a side cross-sectional view of the fixture of FIG. 7 wherein the inner retainer is in the first position;

FIG. 13 is a side cross-sectional view of the fixture of FIG. 7 wherein the inner retainer is in the second position.

DETAILED DESCRIPTION OF THE INVENTION

Figure 1:
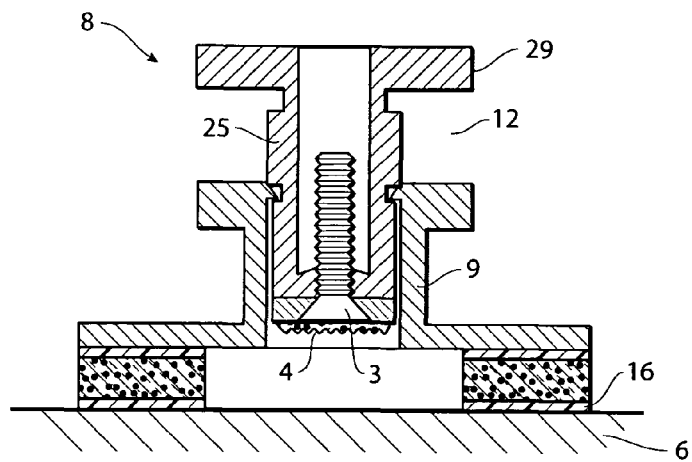
FIG. 1 is a cross-sectional view of a prior art fixture for securing an attachment to a substrate.
Figure 2:
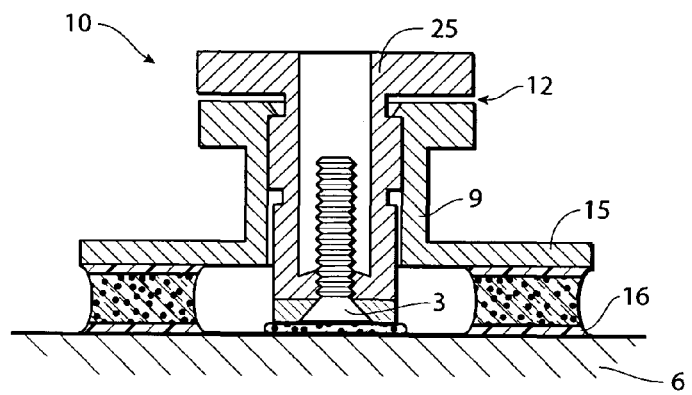
FIG. 2 is a cross-sectional view of a second embodiment of the prior art fixture for securing an attachment to a substrate.

While the present invention is susceptible of embodiment in various forms, as shown in the drawings, hereinafter will be described the presently preferred embodiments of the invention with the understanding that the present disclosure is to be considered as an exemplification of the invention, and it is not intended to limit the invention to the specific embodiments illustrated.

As shown in FIGS. 7-15, I have provided an improved fixture 1 for affixing attachments 3 to a substrate 6. The fixture 1 includes two primary components, an outer support member 9 and an inner retainer 25.

The outer support member 9 includes adhesive pads 16 at the outer support member's distal extremities 15 for temporarily affixing to a substrate 6. The outer support member 9 may be oval, circular or rectangular in construction. However, as shown in the figures, a preferred support member presents a substantially rectangular footprint, and includes a pair of side walls 11 and end walls 13. The end walls and side walls form a central bore 17 for receipt of the inner retainer 25. Moreover, the end walls 13 form flanges 15 at the outer support member's distal extremity for providing an increased surface area for receipt of the temporary adhesives 16. The temporary adhesive may be any adhesive known to those skilled in the art. However, a paper backed pressure sensitive tape or the like is considered preferable.

Meanwhile, the inner retainer 25 is constructed to telescopically move within the outer retainer's central bore 17. The inner retainer may also have a circular or a oval construction, depending on the shape of the outer support member 9. However, as shown in the drawings, the inner retainer is preferably rectangular in shape, including a rectangular sleeve 27. Located at its distal extremity 35, the inner retainer also includes a means (not shown) for temporarily affixing an attachment. As shown in FIGS. 1-6, the inner retainer may include a hole sized to provide a press-fit engagement to the threads of a fastener. Alternatively, various additional constructions for securing an attachment to a fixture can be determined by those skilled in the art.

Figure 3:
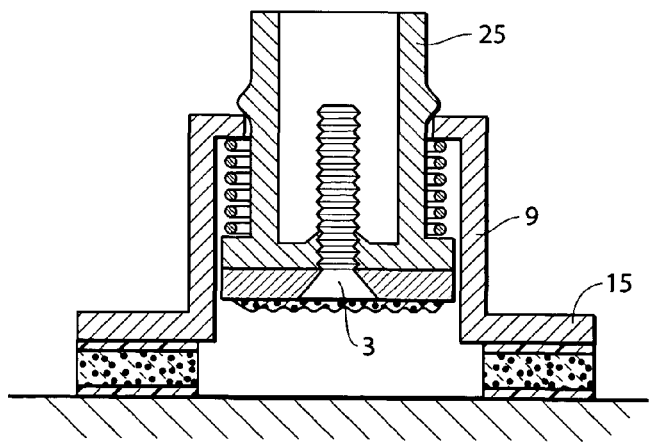
FIG. 3 is a cross-sectional view of a third embodiment of the prior art fixture for securing an attachment to a substrate.
Figure 4:
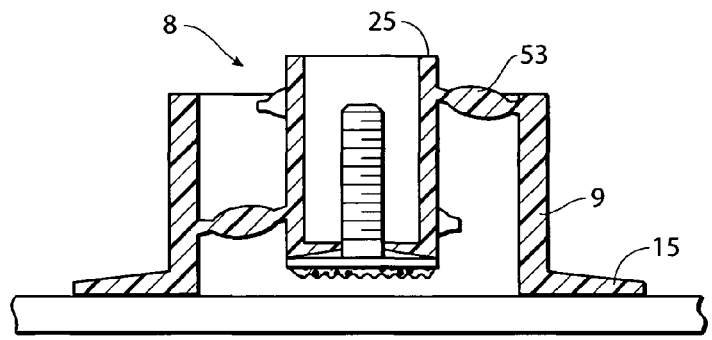
FIG. 4 is a cross-sectional view of a fourth embodiment of the prior art fixture for securing an attachment to a substrate.
Figure 5:
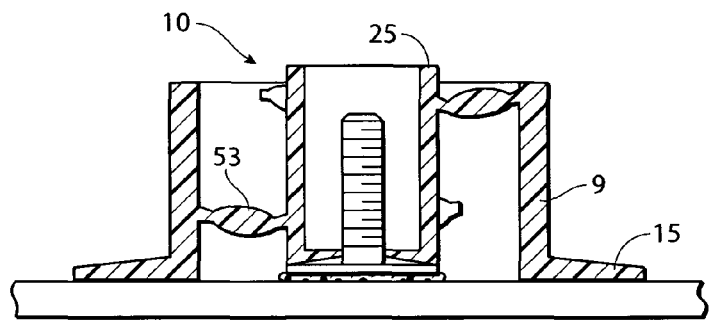
FIG. 5 is a cross-sectional view of a fifth embodiment of the prior art fixture for securing an attachment to a substrate.
Figure 6:
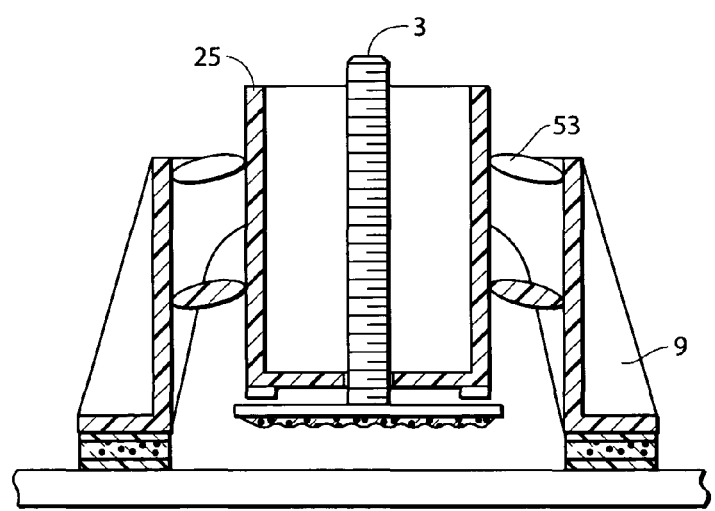
FIG. 6 is a cross-sectional view of a sixth embodiment of the prior art fixture for securing an attachment to a substrate.
Figure 7:
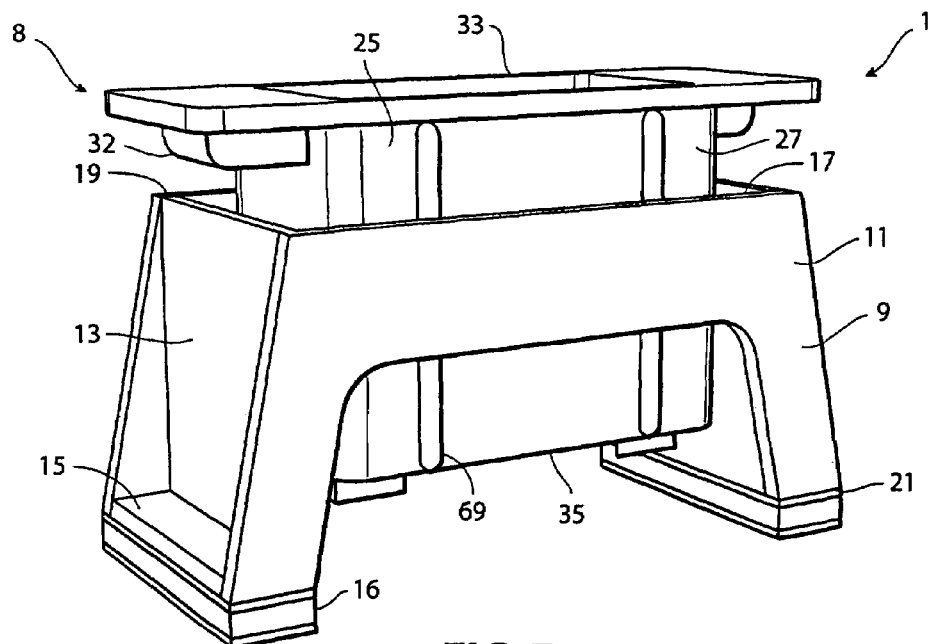
FIG. 7 is a perspective view of the fixture of the present invention for securing an attachment to a substrate.
Figure 8:
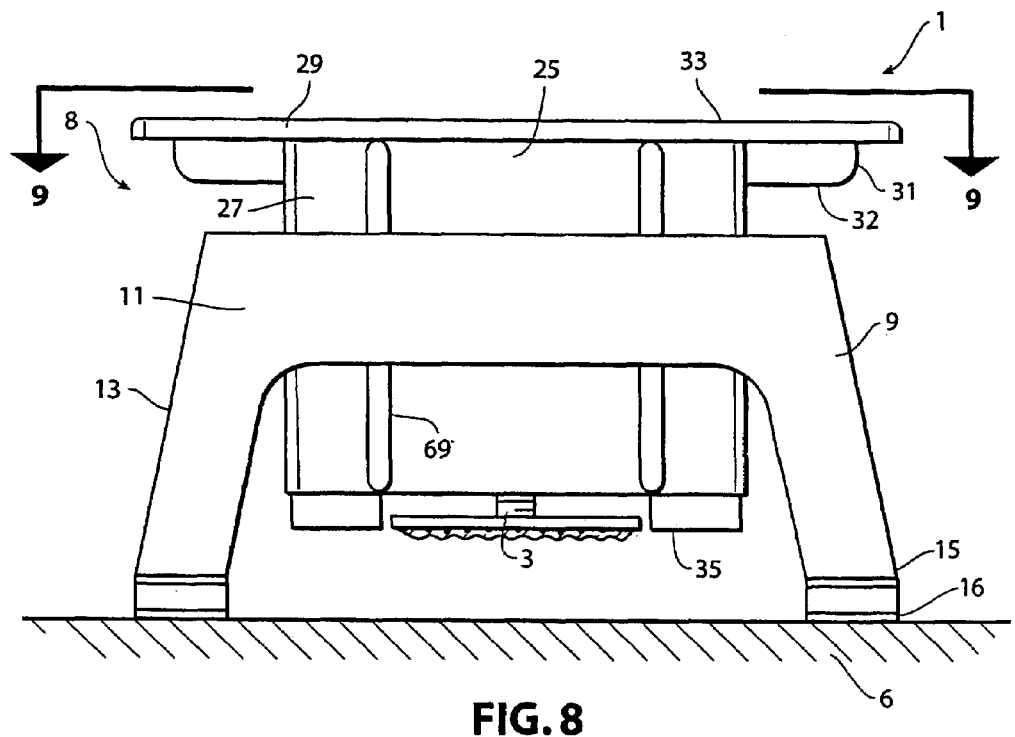
FIG. 8 is a side view of the fixture shown in FIG. 7.
Figure 9:
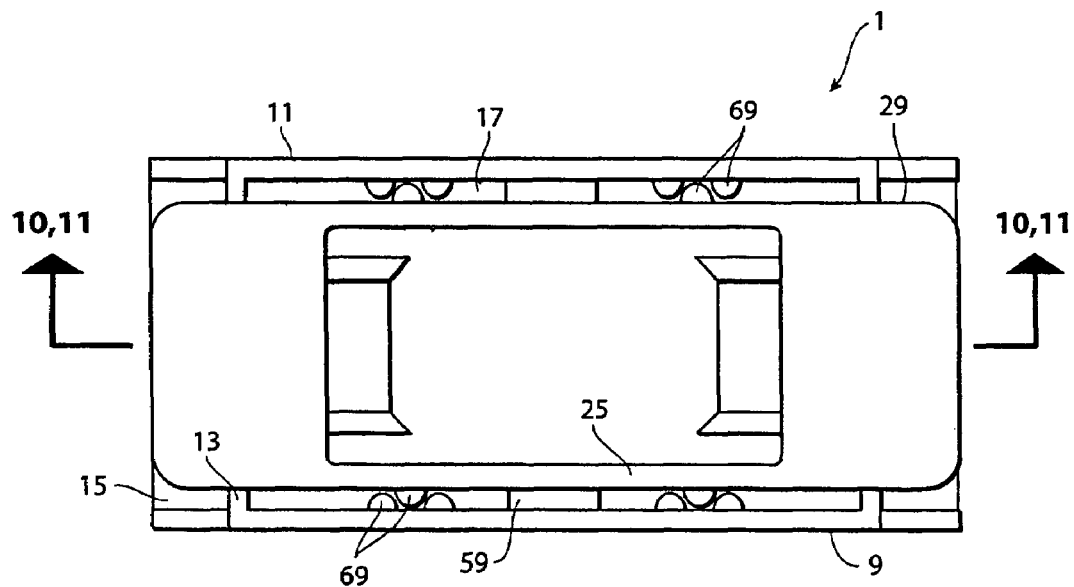
FIG. 9 is a top view of the fixture of FIG. 7.
Figure 10:
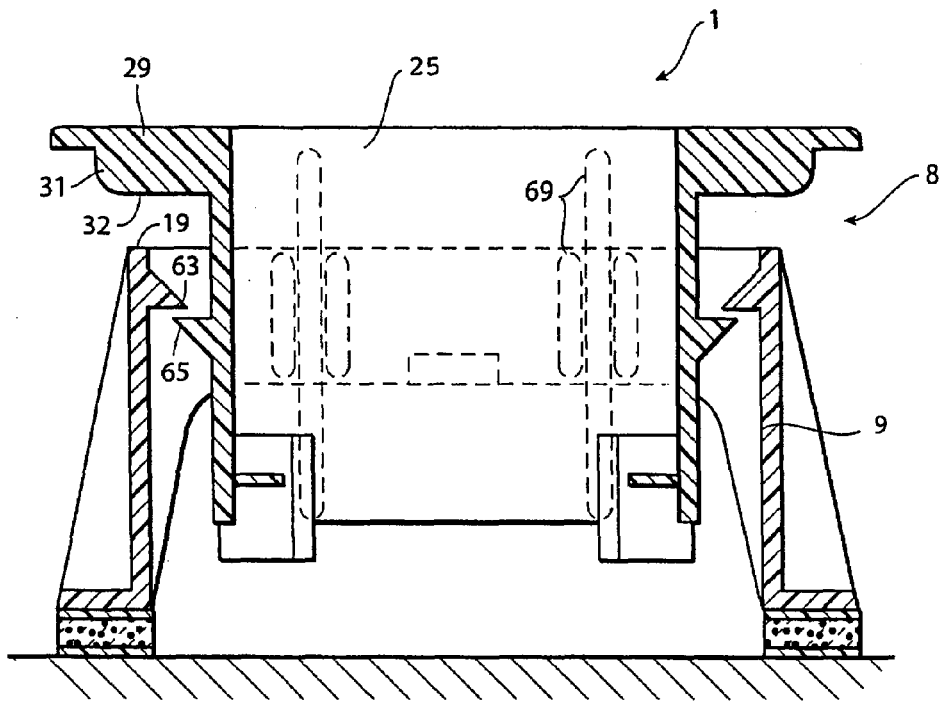
FIG. 10 is a side cross-sectional view of the FIG. 7 wherein the inner retainer is in the first position.

The fixture of the present invention further includes a biasing means for biasing the inner retainer towards a substrate. The biasing means can also take various forms as can be determined by those skilled in the art. For example, the biasing means may utilize the resiliency of the adhesive pads 16 so as to force the inner retainer towards the substrate. As shown in FIG. 3, the fixture may be utilized in an internal spring for biasing the inner retainer in the distal direction. Moreover, as shown in FIGS. 4-6, the fixture may include a plurality of spokes 53. The spokes 53 cooperate to maintain the inner retainer in a generally coaxial alignment with the outer support member. Moreover, when the inner retainer is moved from its non-engaging first position to its engaging second position, the concentrically aligned spokes provide a positive force upon the inner retainer.

Meanwhile, as shown in FIGS. 11-13, in a preferred embodiment, the biasing means includes a latch 55. The latch 55 includes a first pair of beveled edges 57 which project inward from the outer support member 9 and a second pair of beveled edges 59 which project outward from the inner retainer's sleeve 27. As the inner retainer 25 is forced downwardly, the engagement of the respective beveled edges 57 and 59 cause inward and outward deformation of the inner retainer and outer support member's side walls, until the inner retainer's beveled edges pass the outer support member's beveled edges. As shown in FIG. 13, the respective edges engage to lock the inner retainer in the second position 10.

Of importance to the practice of the present invention, the inner retainer 25 includes one or more stops 31 for preventing the inner retainer from telescopically moving toward an underlying substrate beyond the preselected second position. As shown in FIGS. 7-13, in a preferred embodiment, the stop projects radially outward from the inner retainer's proximal extremity 33. Upon movement of the inner retainer from the first position 8 to the second position 10, the stop's shoulder 32 engages the outer support member's proximal extremity 19 to prevent further movement of the inner retainer towards the substrate.

Figure 14:
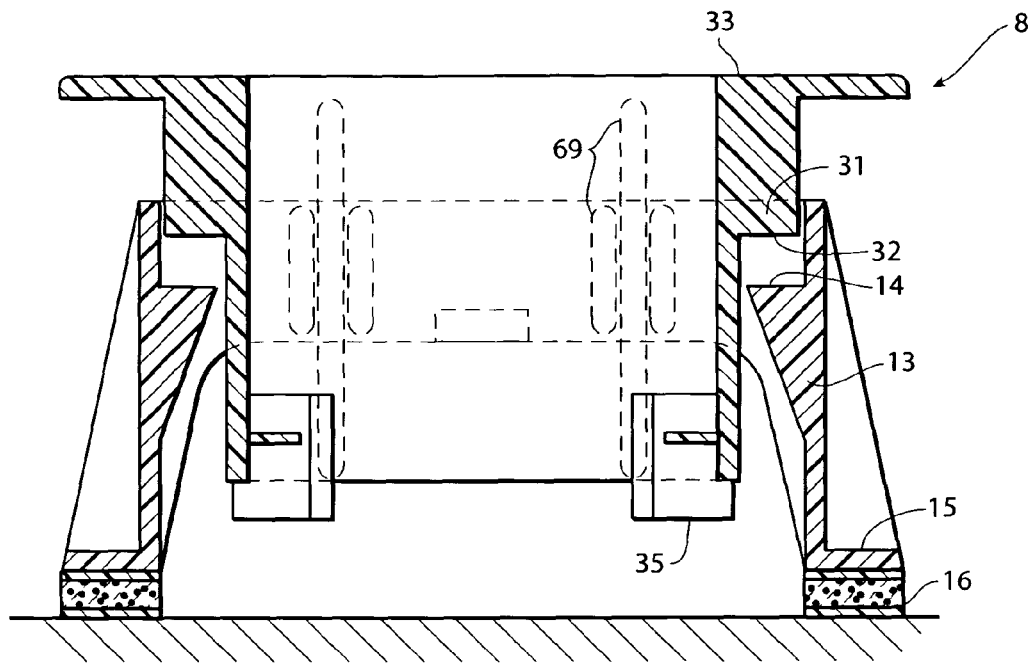
FIG. 14 is a front cross-sectional view of a second embodiment of the fixture of the present invention wherein the inner retainer is in the first position.
Figure 15:
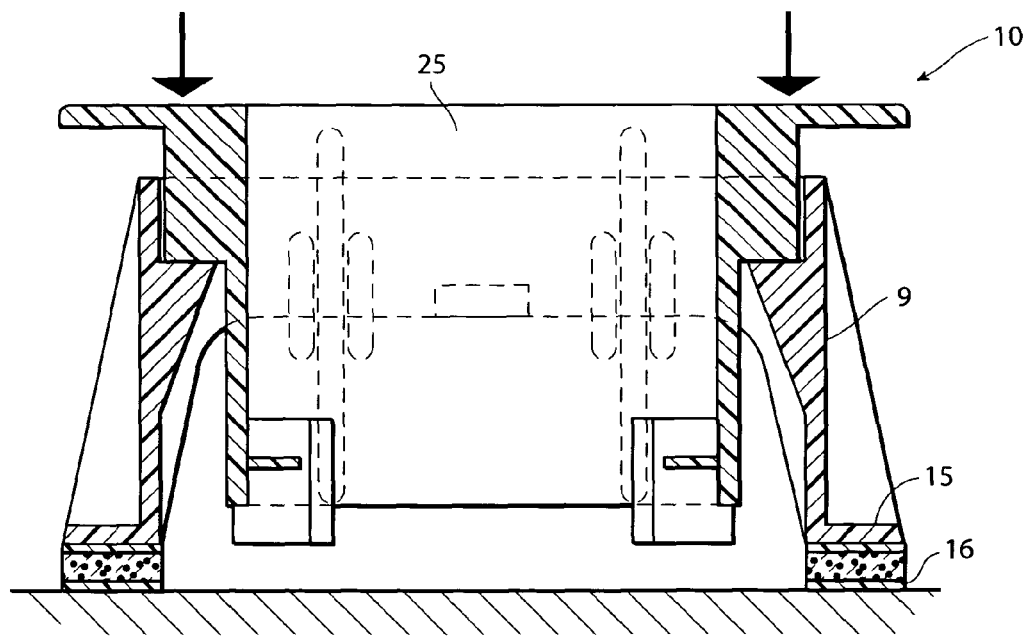
FIG. 15 is a front cross-sectional view of the fixture shown in FIG. 14 wherein the inner retainer is in the second position.

As shown in FIGS. 14 and 15, in an alternative preferred embodiment of the invention, the stop 31 is formed intermediate to the inner retainer's proximal and distal extremities. As the inner retainer is moved from the first position to the second position, the stop's shoulder 32 comes into contact with a shoulder which radially projects inward from the outer support member's end walls 13 to prevent further movement of the inner retainer towards the substrate.

Additional modifications can be made to the fixture 1 of the present invention. For example, the fixture may include alignment rails 69 for maintaining proper coaxial alignment of the inner retainer within the outer support member. Moreover, the fixture may include locking projections 63 and 65 which prevent the inner retainer from inadvertently decoupling from the outer support member.

In operation, the fixture 1 is provided with a fastener 3 attached and with the inner retainer 25 positioned in the "non-engaging" first position 8. A suitable quantity of temporary adhesive 16 is applied to the underside of the fixture's flanges 15. Alternatively, an adhesive material may be applied directly to the substrate 6, such as an adhesive backed tape. The fixture is then temporarily secured onto the substrate at the selected location by pressing the outer support member into secure contact with the substrate. During this temporary securement procedure, the internal retainer remains in the non-engaging first position 8 so that the attachment 3 does not engage the substrate 6. Thereafter, a person applies pressure to the inner retainer's proximal extremity 33 so as to force the inner retainer and attachment 3 towards the substrate. After the attachment 3 and its corresponding permanent adhesive 4 engage the substrate, additional pressure is applied to the inner retainer until the beveled edges 57 and 59 lock the inner retainer in position relative to the outer support member and the stops 31 engage the outer support member. Further pressure applied to the inner retainer's proximal extremity is prevented from being transmitted to the attachment, which would otherwise cause the adhesive 4 to be squeezed out from between the attachment and substrate. Instead, excessive force to the inner retainer is transmitted through the stops to the outer support member's end walls 13, placing them into compression, so as to prevent excessive movement of the inner retainer and attachment towards the substrate.

Once the fixture is applied in place, the latches 55 ensure that the inner retainer maintains positive pressure upon the attachment until the adhesive 16 cures. Upon sufficient curing of the adhesive, the fixture can be easily and quickly removed from the substrate by simply manually lifting the fixture away from the substrate to break the temporary adherence provided by the adhesive 16. The attachment is left secured to the substrate for further use as appropriate.

Having described my invention in such terms so as to enable those skilled in the art to make and use it, and having identified the presently preferred embodiments thereof, I claim:

The invention claimed is:

1. A fastener, fixture and planar substrate combination comprising:
    a fastener having proximal extremity and a radially projecting flat distal extremity for engaging a substantially planar substrate, said distal extremity at least partially covered by an adhesive;
    a planar substrate; and
    a fixture for securing said fastener to said substrate, said fixture having:
        an outer support member including a securing means temporarily securing said outer support member to said substrate, said outer support member including a central bore;
        an inner retainer releasably holding said fastener, said inner retainer telescopically moveable within said outer support's central bore with said outer support member movably supporting said inner retainer for movement between a first position wherein said fastener is out of substantial bearing engagement with said substrate and a second position wherein said fastener is in bearing engagement with said substrate;
        biasing means for biasing said fastener toward said substrate when said inner retainer is moved to said second position; and
        said inner retainer including a stop engaging said outer support member when said inner retainer is moved to said second position, said stop not engaging said outer support member when said inner retainer is in said first position but said stop restricting telescopic movement of said inner retainer relative to said outer support member by engaging said outer support member when said inner retainer is moved to said second position to prevent excessive force and movement by said fastener against the substrate to thereby prevent excess adhesive from seeping from between said fastener's flat distal extremity and said substrate.

2. The fastener, fixture and planar substrate combination of claim 1 wherein:
   said outer support member has a proximal extremity and a distal extremity for engaging a substrate;
   said inner retainer includes a proximal extremity and a distal extremity for releasably holding the attachment; and
   said stop radially projects outward from said inner retainer and includes a shoulder which engages said outer support member's proximal extremity when said inner retainer is moved to said second position.

3. The fastener, fixture and planar substrate combination of claim 2 wherein said fixture is a one-piece construction.

4. The fastener, fixture and planar substrate combination of claim 3 wherein said outer support member is connected to said inner retainer by a plurality of flexible spokes.

5. The fastener, fixture and planar substrate combination of claim 2 wherein said fixture is a two-piece construction.

6. The fastener, fixture and planar substrate combination of claim 2 wherein said securing means includes an adhesive tape adhered to said outer support member.

7. The fastener, fixture and planar substrate combination of claim 1 wherein said biasing means includes an outer beveled edge which projects radially inward from said outer support member and an inner beveled edge which projects outward from said inner retainer, the engagement of said beveled edges locking said inner retainer in said second position.

8. A method of affixing a fastener to a substrate comprising the steps of:
   providing a substantially planar substrate, a fastener having proximal extremity and a radially projecting flat distal extremity which is at least partially covered by an adhesive, and a fixture for securing the fastener to the substrate;
   the fixture having an outer support member including a central bore and a securing means for temporarily securing the outer support member to the substrate, the fixture further having an inner retainer releasably holding the fastener which is telescopically moveable within the outer support's central bore with the outer support member movably supporting the inner retainer for movement of the inner retainer between a first position and a second position, the fixture further having a biasing means for biasing the fastener when the inner retainer is moved to the second position; and the inner retainer including a stop engaging the outer support member when the inner retainer is moved to the second position, and the stop not engaging the outer support member when the inner retainer is in the first position;
   positioning the fastener's securing means against a substrate with the inner retainer positioned in the first position with the fastener's distal extremity not engaging the substrate;
   manually forcing the inner retainer into the second position with the fastener's distal extremity and adhesive engaging the substrate and the stop restricting telescopic movement of the inner retainer relative to the outer support member by engaging the outer support member when the inner retainer is moved to the second position to prevent excessive force and movement by the fastener against the substrate to thereby prevent excess adhesive from seeping from between the fastener's flat distal extremity and the substrate; and
   disengaging the fixture from the fastener and substrate.

9. The method of affixing a fastener to a substrate of claim 8 wherein:
   said outer support member has a proximal extremity and a distal extremity for engaging a substrate;
   said inner retainer includes a proximal extremity and a distal extremity for releasably holding the fixture; and
   said stop radially projects outward from said inner retainer and includes a shoulder which engages said outer support member's proximal extremity when said inner retainer is moved to said second position.

10. The method of affixing a fastener to a substrate of claim 9 wherein said fixture is a one-piece construction.

11. The method of affixing a fastener to a substrate of claim 10 wherein said outer support member is connected to said inner retainer by a plurality of flexible spokes.

12. The method of affixing a fastener to a substrate of claim 9 wherein said fixture is a two-piece construction.

13. The method of affixing a fastener to a substrate of claim 9 wherein said securing means includes an adhesive tape adhered to said outer support member.

14. The method of affixing a fastener to a substrate of claim 8 wherein said biasing means includes an outer beveled edge which projects radially inward from said outer support member and an inner beveled edge which projects outward from said inner retainer, the engagement of said beveled edges locking said inner retainer in said second position.

* * * * *